United States Patent [19]

Morrison et al.

[11] 4,341,855

[45] Jul. 27, 1982

[54] PHOTOGRAPHIC ELEMENT PROVIDED WITH A MAGNETIC RECORDING STRIPE AND METHOD AND COMPOSITION FOR MANUFACTURE THEREOF

[75] Inventors: Edward D. Morrison, Rochester; Harry J. Krall, Webster; David L. Carr, Fairport; Chen-i Lu, Webster, all of N.Y.

[73] Assignee: Eastman Kodak Company, Rochester, N.Y.

[21] Appl. No.: 160,759

[22] Filed: Jun. 18, 1980

Related U.S. Application Data

[63] Continuation of Ser. No. 40,605, May 18, 1979, abandoned.

[51] Int. Cl.³ .............................................. C04B 35/04
[52] U.S. Cl. .................. 430/140; 252/62.54; 427/128; 427/130; 427/131; 427/340; 428/694; 428/900; 430/510; 430/513; 430/514

[58] Field of Search ................................ 427/127–132; 252/62.54; 428/413, 694, 900, 510, 522; 430/140, 514, 510, 513

[56] References Cited

U.S. PATENT DOCUMENTS

3,704,167  11/1972  Yamamoto et al. ................ 117/239
4,072,592  2/1978  Dué et al. ........................ 204/159.15

Primary Examiner—Bernard D. Pianalto
Attorney, Agent, or Firm—A. P. Lorenzo

[57] ABSTRACT

Photographic elements are provided with a magnetic stripe that is useful for sound recording by applying a magnetic striping composition, containing finely-divided magnetic particles and an acrylated epoxy resin, over the anti-halation layer of the element. The striping composition penetrates the anti-halation layer to contact the support and is cured to an alkali-insoluble cross-linked stripe which is composite with the anti-halation layer and strongly bonded to the support so as to resist removal by alkaline photographic processing solutions.

35 Claims, 4 Drawing Figures

PHOTOGRAPHIC ELEMENT PROVIDED WITH A MAGNETIC RECORDING STRIPE AND METHOD AND COMPOSITION FOR MANUFACTURE THEREOF

This is a continuation of application Ser. No. 040,605, filed May 18, 1979, abandoned.

CROSS-REFERENCES TO RELATED APPLICATIONS

U.S. Patent application Ser. No. 037,585, entitled "Method For Forming Magnetic Recording Regions On Photographic Elements" filed on May 9, 1979, in the names of Walter W. Jacobe and Gary K. Bien and issued Apr. 7, 1981 as U.S. Pat. No. 4,260,648, discloses a method for forming a magnetic recording region, such as a stripe or layer, on a photographic element by applying a dispersion of finely-divided magnetic particles in a liquid medium to the element in a predetermined form and solidifying the dispersion by bringing the element into contact with an induction-heating apparatus.

BACKGROUND OF THE INVENTION

1. Field of the Invention

This invention relates in general to photography and in particular to photographic elements provided with a magnetic stripe that is useful for sound recording. More specifically, this invention relates to photographic elements having a magnetic recording stripe comprised of finely-divided magnetic particles dispersed in an alkali-insoluble, cross-linked polymeric matrix, to a process for the manufacture of the aforesaid elements, and to a coating composition for use in the manufacture of the aforesaid elements.

2. Description of the Prior Art

A well known method of applying a magnetic recording stripe to a photographic element is to apply the magnetic striping composition over the anti-halation layer which is present on the back side of the support, that is, on the side of the support opposite to the image-forming layers. However, the anti-halation layer is designed to be removed during processing of the element, and, accordingly, is comprised of a binder which is soluble in alkaline photographic processing solutions. Thus, if the magnetic stripe is applied over the anti-halation layer, it will be removed along with the anti-halation layer during processing unless suitable procedures are utilized to avoid such removal. Among the procedures which are known for this purpose is that of U.S. Pat. No. 3,220,843. As described in this patent, a magnetic stripe which is composite with the anti-halation layer and firmly adhered to the support so as to resist removal by alkaline photographic processing solutions can be formed by incorporating an N,N-dialkylamide in the magnetic striping composition. By use of the N,N-dialkylamide, the anti-halation layer is partially or completely dissolved in the region of the stripe and the striping composition is thereby able to reach the support and anchor thereto. A similar procedure is described in U.S. Pat. No. 3,647,541 in which the magnetic striping composition contains a combination of 2-methoxy ethanol and a dioxane. A different approach to the problem of applying a magnetic striping composition over an anti-halation layer is to incorporate in the magnetic striping composition an agent which is capable of reacting with the binder in the anti-halation layer to thereby insolubilize the anti-halation layer in the region of the stripe and prevent its removal in photographic processing solutions. This technique has been the subject of several patents, each of which relates to the use of particular insolubilizing agents; for example, the diazomethanes of U.S. Pat. No. 3,227,555, the compounds with reactive aldehyde groups of U.S. Pat. No. 3,840,374, the compounds having isocyanato or thioisocyanato groups of U.S. Pat. No. 3,870,525, the carbodiimides of U.S. Pat. No. 3,891,444, the m-benzene disulfofluorides of U.S. Pat. No. 3,999,992, and the combinations of bis-epoxides or polyepoxides with formamide or a sulfoxide of U.S. Pat. No. 4,008,088.

While the methods of the prior art are capable of providing a magnetic recording stripe which resists removal by alkaline photographic processing solutions to a fair degree, they suffer from significant disadvantages which restrict their usefulness. For example, the magnetic striping composition may require a lengthy drying period with the result that drying chambers must be of great length and, consequently, are very costly. Moreover, because of the long time and relatively high temperatures needed for drying, rehumidification chambers may be needed to replace moisture driven out of the photographic element during the drying operation. This adds greatly to the cost and complexity of the equipment. Also, in cases where a solvent incorporated in the striping composition is of high boiling point, the temperatures required to completely dry the stripe may be so high as to render it very difficult to avoid damage to the photographic element. Many other limitations also restrict the usefulness of the compositions and methods of the prior art. For example, the striping compositions are frequently lacking in adequate storage stability, incapable of adequately dispersing the magnetic particles, difficult to coat, or incapable of accepting a sufficiently high loading of magnetic particles with the result that the stripe is lacking in adequate frequency response and audio output. Moreover, the stripe often does not have adequate adhesion to the element and because of the difficulty in coating may lack the precise width and thickness characteristics necessary for optimum performance. The requirement of precise width and thickness is critical in the magnetic striping art. This is true both for the magnetic recording stripe and for the balance stripe which is located on the same side of the film as the recording stripe but adjacent to the opposite edge of the film, and is intended to provide for uniform stacking of the film convolutions as the film is wound on a core. Moreover, since these stripes must be very narrow—typically about 0.7 millimeters for the recording stripe and about 0.35 millimeters for the balance stripe on 8 millimeter motion picture film—it is apparent that the coating operation is a very difficult one and that the striping composition must meet very exacting requirements to enable it to be satisfactorily coated.

It is toward the objective of providing an improved composition and method for magnetic striping of photographic elements which overcomes many of the disadvantages and limitations of the prior art that the present invention is directed.

SUMMARY OF THE INVENTION

In accordance with this invention, a magnetic stripe is formed on a photographic element from a striping composition comprising a suspension of finely-divided magnetic particles in a reactive liquid medium that is capable of being cured to a solid matrix. The photographic element is comprised of a support having thereon an anti-halation layer which contains an alkali-soluble binder that renders such layer removable by an alkaline photographic processing solution. The striping composition is deposited in the form of a stripe on the anti-halation layer of the photographic element and is then cured by a suitable procedure such as by the application of heat or by radiation-curing. The reactive liquid medium comprises (a) an acrylated epoxy resin, (b) a polymerizable acrylic monomer, and (c) an organic solvent that is capable of solubilizing the anti-halation layer. As a result of the combined functioning of these components, the striping composition penetrates through the anti-halation layer and the reactive liquid medium is cured to an alkali-insoluble cross-linked polymeric matrix which surrounds the magnetic particles and bonds to the support. The resulting magnetic stripe is composite with the anti-halation layer and strongly bonded to the support so as to resist removal by alkaline photographic processing solutions. Accordingly, upon processing of the photographic element in alkaline solutions, the anti-halation layer is removed except in the region where it is composite with the magnetic stripe and this region remains firmly adhered, as desired.

DESCRIPTION OF THE PREFERRED EMBODIMENTS

The method of this invention is useful for the application of magnetic recording stripes to a wide variety of photographic elements. The elements to which it is usefully applied have in common the presence of an anti-halation layer that is removable in alkaline processing solutions, but they may differ widely in regard to the type of support, the number and composition of the image-forming layers, and the kinds of auxiliary layers which are present. Since the magnetic stripe must resist removal by alkaline processing solutions and since it is advantageous for the magnetic stripe to be applied over the anti-halation layer, the method of this invention is predicated on the use of a striping composition that penetrates the anti-halation layer and anchors to the support. The invention provides a substantial advance in the art of magnetic striping in that the compositions employed are not only capable of penetrating the anti-halation layer and strongly bonding to the support but also have many other advantageous characteristics such as good storage stability, ability to disperse and suspend substantial concentrations of magnetic particles, excellent coating characteristics which facilitate precise deposition, and the ability to be rapidly cured under conditions which do not harm the photographic element.

Magnetic striping compositions are typically applied to photographic elements after the image-forming layer(s) and auxiliary layers have been applied. Thus, for example, a web support can be coated on one side with an anti-halation layer, then coated on the opposite side with one or more image-forming layers, such as silver halide gelatin emulsion layers, then slit to a desired width, and then striped with a magnetic striping composition. This procedure is advantageous in that the wide web is adapted to efficient and economical coating of anti-halation and image-forming layers and the narrow strips cut from the web are adapted to efficient and economical handling in a striping operation. However, the image-forming layer(s) can be applied after magnetic striping, if desired, so that the element to which the magnetic striping composition is applied can be comprised of a support, an anti-halation layer and one or more image-forming layers or only of a support and an anti-halation layer. In applying the magnetic striping composition after application of the image-forming layer(s) it is, of course, essential that the conditions utilized in applying and curing the stripe do not harm the sensitive image-forming layers, and this renders the process of magnetic striping especially difficult.

Figure 1:
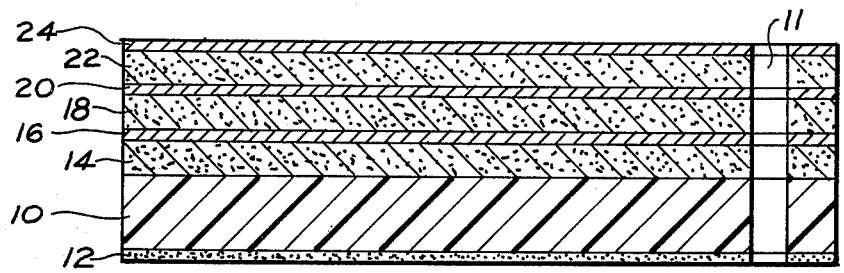
FIG. 1 is an enlarged fragmentary section of a photographic element of the type which is provided with a magnetic stripe in accordance with this invention.

FIG. 1 illustrates a typical motion picture film prior to magnetic striping. The film comprises a support 10 having on one side thereof an anti-halation layer 12 and on the opposite side a red-sensitive emulsion layer 14, a gelatin interlayer 16, a green-sensitive emulsion layer 18, a yellow filter layer 20, a blue-sensitive emulsion layer 22, and a gelatin overcoat 24. A row of perforations 11 is disposed along one side of the film.

Figure 2:
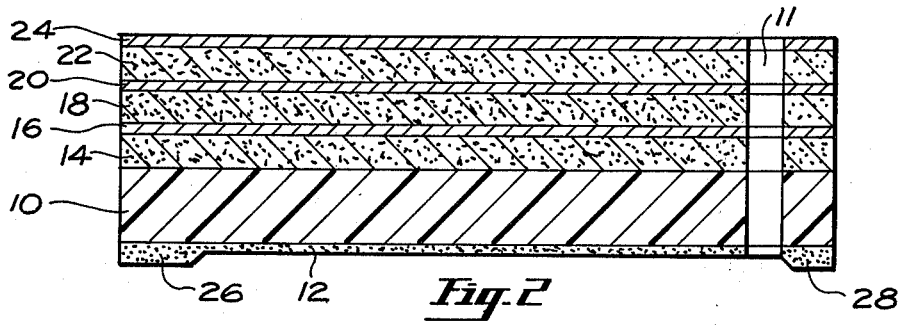
FIG. 2 is an enlarged fragmentary section illustrating the element of FIG. 1 after application thereto of a magnetic recording stripe and a balance stripe by the method of this invention.

FIG. 2 illustrates the motion picture film of FIG. 1 after application thereto of a magnetic recording stripe and a balance stripe. As shown in FIG. 2, recording stripe 26 is located along one edge of the film and balance stripe 28 is located along the opposite edge of the film outside the row of perforations 11. Both recording stripe 26 and balance stripe 28 are composite with anti-halation layer 12 and bonded to support 10.

Figure 3:
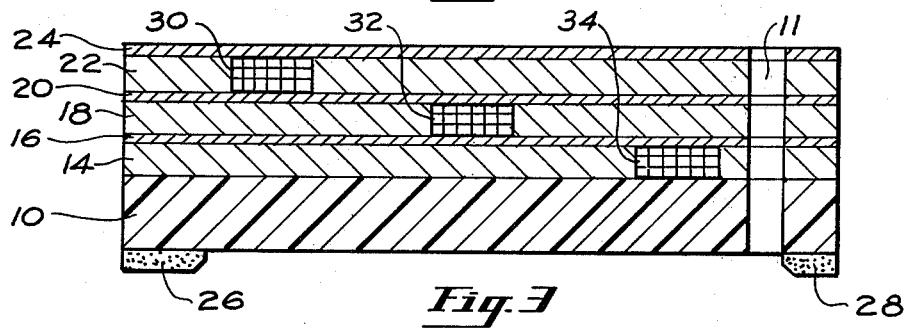
FIG. 3 is an enlarged fragmentary section illustrating the element of FIG. 1 after application thereto of a magnetic recording stripe and a balance stripe by the method of this invention and subsequent processing of the element.

FIG. 3 illustrates the motion picture film of FIG. 2 after exposure and photographic processing. As a result of exposure and processing, dye images 30, 32, an 34 have been formed in emulsion layers 22, 18 and 14, respectively, and anti-halation layer 12 has been removed except in the areas occupied by recording stripe 26 and balance stripe 28 which remain firmly anchored to support 10.

The photographic elements of the present invention can be comprised of any of the useful photographic support materials. For example, the support can be composed of cellulose esters such as cellulose triacetate, cellulose acetate propionate or cellulose acetate butyrate, polyesters such as poly(ethylene terephthalate), polyamides, polycarbonates, polyimides, polyolefins, poly(vinyl acetals), polyethers, polysulfonamides, and the like.

The anti-halation layer which is coated on one side of the support functions to prevent light that strikes the support from being reflected into the image-forming layer(s). It is comprised of a dye or pigment, which functions to absorb the light, dispersed in an alkali-soluble binder that renders the layer removable by an alkaline photographic processing solution. Most commonly, the light-absorbing material utilized is carbon black and the binder is a cellulose ester such as cellulose acetate phthalate. Anti-halation layers containing carbon black and cellulose acetate phthalate are described in the prior art, for example, in U.S. Pat. No. 2,327,828. Dyes or other pigments can, of course, be used in place of carbon black and a wide variety of alkali-soluble binders can be used in place of cellulose acetate phthalate.

One or more image-forming layers are coated on the support on the side opposite to the anti-halation layer. Other layers, such as subbing layers, interlayers, filter layers, protective overcoat layers and so forth can also be present. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatino/silver halide emulsion layer.

The magnetic striping compositions of this invention are comprised of a suspension of finely-divided magnetic particles in a reactive liquid medium. Cubic or acicular iron oxide ferromagnetic particles, particularly acicular gamma ferric oxides or acicular ferrous ferric oxides, are especially useful. Such particles may be doped with one or more metal ions of a polyvalent metal such as cobalt, nickel, chromium, zinc, manganese, and the like. A particularly desirable material is acicular gamma ferric oxide or ferrous ferric oxide having an acicularity ratio above 3, and preferably above 5, and an average particle size in the range from about 0.03 to about 1.2 microns. Additional suitable ferromagnetic particles include chromium dioxide, ferrites, alloys such as iron alloys, and the like.

The first essential component of the reactive liquid medium is an acrylated epoxy resin. The acrylated epoxy resins are well known materials and resins of this type have been described in numerous patents, for example, in U.S. Pat. Nos. 3,661,576, 3,673,140, 3,713,864, and 3,772,062 and in British Pat. No. 1,375,177. Typical resins of this type are those derived from bisphenols. In a preferred embodiment of this invention, the acrylated epoxy resin is a reaction product of epichlorohydrin, bisphenol-A and an acrylic monomer, such reaction product being represented by the formula:

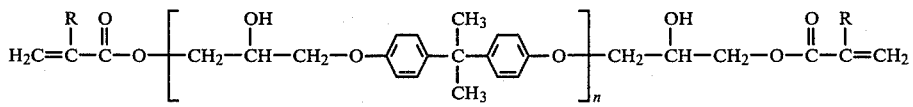

wherein R is a hydrogen atom or a methyl group and n is 1 to 20. These reaction products are relatively viscous liquids when n is low, e.g., 1 to 3, which become increasingly viscous as the value of n increases and are solids when n is high, e.g., 10 to 20.

The second essential component of the reactive liquid medium is a polymerizable acrylic monomer. Such monomers are relatively low viscosity liquids and thus act to reduce the viscosity of the dispersion. In the curing step they are converted, together with the acrylated epoxy resin, to a solid cross-linked polymeric matrix. Because they tend to be more reactive than the acrylated epoxy resins, they function to increase the rate of polymerization and cross-linking. Useful acrylic monomers include monofunctional monomers and polyfunctional monomers. Examples of monofunctional acrylic monomers that are useful in the reactive liquid medium include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers that are useful in the reactive liquid medium include:
neopentylglycol diacrylate,
pentaerythritol triacrylate,
1,6-hexanediol diacrylate,
trimethylolpropane triacrylate,
tetraethylene glycol diacrylate,
1,3-butylene glycol diacrylate,
trimethylolpropane trimethacrylate,
1,3-butylene glycol dimethacrylate,
ethylene glycol dimethacrylate,
pentaerythritol tetraacrylate,
tetraethylene glycol dimethacrylate,
1,6-hexanediol dimethacrylate,
ethylene glycol diacrylate,
diethylene glycol diacrylate,
glycerol diacrylate,
glycerol triacrylate,
1,3-propanediol diacrylate,
1,3-propanediol dimethacrylate,
1,2,4-butanetriol trimethacrylate,
1,4-cyclohexanediol diacrylate,
1,4-cyclohexanediol dimethacrylate,
pentaerythritol diacrylate,
1,5-pentanediol dimethacrylate, and the like.
Preferred polyfunctional acrylic monomers are those of the formula:

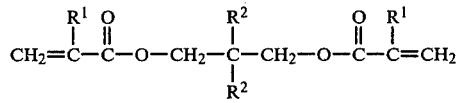

where
each $R^1$ is independently selected from the group consisting of a hydrogen atom and an alkyl group of 1 to 2 carbon atoms,
each $R^2$ is independently selected from the group consisting of an alkyl group of 1 to 6 carbon atoms and a radical of the formula:

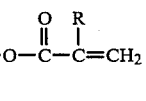

in which R is a hydrogen atom or an alkyl group of 1 to 2 carbon atoms.

Optimum results are generally obtained in the method of this invention with difunctional acrylic monomers. Monofunctional monomers have the disadvantage of lower cure rate, while trifunctional monomers and monomers with higher functionality are generally not as effective in reducing viscosity and tend to increase brittleness in the cured coating. On the other hand, difunctional acrylic monomers provide a combination of good solvating power, excellent compatibility with other components, viscosity reduction, rapid cure, and desirable mechanical properties in the cured coating.

In addition to the acrylated epoxy resin and the polymerizable acrylic monomer, the other essential component of the reactive liquid medium is an organic solvent that is capable of solubilizing the anti-halation layer. As used herein, the term "organic solvent" is intended to encompass a single compound or mixtures of two or more compounds. Useful organic solvents include alcohols, ketones, esters, ethers, glycols, hydrocarbons, and halogenated hydrocarbons. Particularly good results are achieved with an organic solvent that comprises a mixture of a lower aliphatic alcohol an a ketone or a mixture of a lower aliphatic alcohol and an organic ester.

Preferred lower aliphatic alcohols for use in the magnetic striping compositions of this invention are those containing 1 to 6 carbon atoms, such as methanol, ethanol, n-propyl alcohol, ispropyl alcohol, n-butyl alcohol, isobutyl alcohol, n-pentyl alcohol, n-hexyl alcohol, and the like.

Organic esters preferred for use in the magnetic striping compositions of this invention are those represented by the formula RCOOR' where R and R' are alkyl groups of 1 to 4 carbon atoms, such as methyl acetate, ethyl acetate, n-propyl acetate, isobutyl acetate, ethyl propionate, ethyl isobutyrate, and the like.

Preferred ketones for use in the magnetic striping compositions of this invention are those represented by the formula:

where R and R' are alkyl groups of 1 to 4 carbon atoms, such as acetone, methyl ethyl ketone, methyl n-propyl ketone, diethyl ketone, and the like.

In the magnetic striping compositions of this invention, the organic solvent acts as a "biting agent" to penetrate through the anti-halation layer and contact the support. It also acts as a dispersing aid to promote formation of a uniform stable dispersion of the magnetic particles in the reactive liquid medium.

More than one member of a particular class of compounds, for example, two different alcohols or two different ketones can be used, if desired, or the organic solvent can comprise a mixture of compounds from several different classes, such as a mixture of an alcohol, a ketone and an organic ester. For example, mixtures of two ketones can be used in which one, e.g., acetone, is intended primarily as a "biting agent" and the other, e.g., methyl ethyl ketone, is intended primarily as a dispersing aid. Particularly preferred for use in the magnetic striping composition is a mixture of methanol and acetone or a mixture of methanol and ethyl acetate. An optimum formulation is one comprising methanol, acetone, and methyl ethyl ketone.

In order to form a uniform stable dispersion of the magnetic particles, the reactive liquid medium preferably has a viscosity in the range from about 1,000 to about 10,000 centipoises.

In preparing the magnetic striping composition, the magnetic particles and the components making up the reactive liquid medium can be utilized within a wide range of proportions. Optimum amounts are dependent upon many factors, including the particular ingredients utilized in the striping formulation, the composition of the support and the anti-halation layer, the type of apparatus utilized in applying the striping composition, the particular method of curing utilized, and so forth. Typically, the reactive liquid medium will be composed on a weight basis, of about 20 to 80 percent of acrylated epoxy resin, about 10 to 40 percent of polymerizable acrylic monomer, and at least about 5 percent of an organic solvent that is capable of solubilizing the anti-halation layer. In making up the magnetic striping dispersion, the magnetic particles are typically combined with the reactive liquid medium in an amount of about 20 to about 150 parts of magnetic particles per 100 parts by weight of reactive liquid medium. It is desirable to utilize a high loading of magnetic particles so that after curing there will be a sufficient number of magnetic particles per unit volume in the stripe to give the desired magnetic properties. However, the loading should not be so high that the dispersion becomes so viscous and pasty that it cannot be properly coated. It is advantageous to keep the total amount of solvent in the reactive liquid medium as low as possible. In this way, curing can be completed quickly since there is only a relatively small amount of liquid which must be removed. Moreover, rapid curing can be accomplished without the risk of forming bubbles in the stripe if the amount of solvent is small. However, sufficient solvent must be used to properly disperse the magnetic particles and to provide a composition that can be coated with the required precision.

Any of a variety of other materials can be included in the reactive liquid medium to advantageously modify the properties of the magnetic striping composition. For example, surfactants can be included as dispersion aids. Useful surfactants include the fluorocarbons, fatty acid sulfonates, alkyl sulfosuccinates, alkylphenoxypoly(alkylene oxides), adducts of glycidol and an alkyl phenol, and the like. To modify the rheological properties of the striping composition in a manner which promotes its coatability, polymers can be added to improve such properties as cohesive strength. A polymer which is particularly useful for this purpose is a high molecular weight cellulose nitrate. Amounts of cellulose nitrate of from about 10 to about 50 percent of the amount of acrylated epoxy resin on a weight basis are preferred.

With any of the components described herein as useful components of the reactive liquid medium, mixtures can be used as well as individual ingredients. For example, it will sometimes be desirable to utilize a mixture of two or more polymerizable acrylic monomers to impart particular desired properties to the composition, such as a high curing rate without the formation of excessive brittleness.

The method of this invention comprises the steps of depositing the magnetic striping composition on the anti-halation layer of the photographic element and then curing to convert the reactive liquid medium to an alkali-insoluble cross-linked polymeric matrix which surrounds the magnetic particles and bonds to the support. Any of several different procedures can be used in carrying out the application of the magnetic striping composition on the anti-halation layer of the photographic element. For example, it can be applied by the use of a coating apparatus having a rectangular extrusion slot, such as is described in U.S. Pat. No. 3,062,181, or with a coating apparatus comprising a die having a cylindrical bore as is described in Product Licensing Index, November 1971, Item No. 9111, Page 52, or with a coating apparatus comprising a die having two or more cylindrical bores as is described in Belgian Pat. No. 842,115. It can also be applied by the use of a gravure cylinder, using well known techniques of gravure or intaglio coating, or by the use of a grooved applicator roll. A variety of methods are also suitable for carrying out the curing step, as hereinafter described in greater detail. In the curing step, both the acrylated epoxy resin and the polymerizable acrylic monomer become part of the polymeric matrix. The non-polymerizable solvents that are present are removed from the coating during the curing step. However, since the acrylated epoxy resin and the polymerizable acrylic monomer typically make up a substantial portion of the liquid medium, the total amount of solvent which must be removed is much less than in many prior art systems and the curing time can be commensurately less. For example, magnetic striping compositions prepared in accordance with the prior art have contained as much as 80 percent by weight of solvents which must be removed in drying. In order to remove this large quantity of solvent, lengthy drying times, and correspondingly large drying chambers, have been necessary. With the present invention, short curing times and commensurately small curing chambers are feasible. Moreover, the magnetic striping composition of this invention does not require the presence of solvents with high boiling points so that lower temperatures than have been needed with some prior art systems can be used in the curing step.

Figure 4:
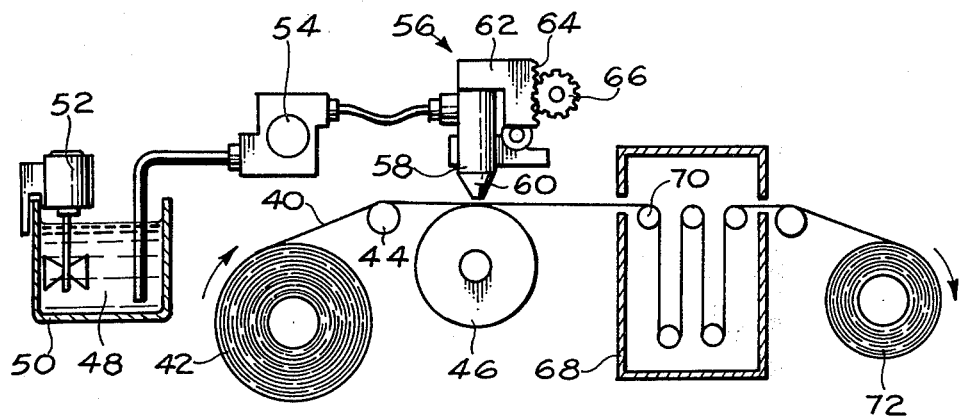
FIG. 4 is a schematic illustration of coating and curing apparatus which is suitable for carrying out the method of this invention.

FIG. 4 illustrates the steps of applying the magnetic striping composition to a photographic film and curing the stripe in accordance with this invention. As shown in FIG. 4, photographic film 40 is unwound from supply roll 42 and passes over guide roll 44 and then over coating roll 46 where it is coated with a narrow stripe of magnetic striping composition. The magnetic striping composition 48 is held in tank 50, where it is kept in constant agitation by mixer 52, and is pumped by metering pump 54 to coating hopper 56 which applies it in the form of a narrow stripe to film 40. Coating hopper 56 includes chamber 58, which is equipped with nozzle 60 for delivering the striping composition, and is mounted on frame member 62 equipped with rack 64 and operatively associated with pinion gear 66 such that rotation of gear 66 adjusts the vertical position of coating hopper 56 with respect to the path of film 40. After application of the stripe by coating hopper 56, film 40 is advanced into curing chamber 68, over a series of guide rolls 70, and finally is wound up on take-up roll 72. In curing chamber 68, hot air or other gaseous medium is brought into contact with film 40 in order to bring about curing of the stripe.

While the magnetic striping compositions of this invention can be satisfactorily cured by contact with hot air or other gaseous medium in a suitable curing chamber, this generally requires a considerable period of time—such as a period of about 30 minutes at an air temperature of 120° C. and longer times at lower temperatures—and other methods of curing are frequently advantageous in providing uch shorter curing times. Many different methods of curing can be used. For example, curing can be carried out by the use of infrared radiation, or by the use of ultraviolet radiation, or by the use of electron radiation. Of course, when the stripe is being cured on a photographic element that carries on its opposite side one or more image-forming layers, such as radiation-sensitive gelatino/silver halide emulsion layers—as is usually the case—care must be taken to protect the image-forming layers from harmful rays. For example, infrared and ultraviolet radiation should not be used for curing unless wavelengths in the visible region are eliminated and electron radiation should not be used unless x-rays and secondary radiation are eliminated. Very short curing times can be achieved with these methods of curing, such as times from a fraction of a second to a few minutes. Similar short curing times can also be achieved by the use of an induction coil which generates heat by induction within the stripe, or by bringing the stripe into contact with a metal surface that is heated to an appropriate temperature by suitable means such as electrical heating elements or a hot circulating fluid.

More specifically, an advantageous method of curing the magnetic stripe involves passing it around two heated rolls in an S-wrap configuration. The rolls can be heated to a suitable temperature, such as a surface temperature of about 150° C., by embedded electrical elements. As an alternative to the use of an S-wrap configuration, the photographic element can be passed in a spiral fashion within the groove of a spirally-grooved electrically-heated roll with the stripe in contact with the surface of the groove. This technique has an advantage in that it more efficiently utilizes the space required for curing.

Systems of curing utilizing induction heating to generate heat within the stripe as a result of the presence of the magnetic particles are also advantageous. This type of heating is particularly effective in that the heat produced by the induction coil is generated only within the magnetic stripe so that it does not harm the image-forming layers. A suitable system involves the use of a rotating wheel formed from an electrically-insulating material passing through one or more stationary induction coils. The wheel can be surface driven so that the induction coil(s) can be wrapped around both the wheel and the moving photographic film. The curing process can advantageously utilize two coils, the first coil to initiate the polymerization reaction and the second coil to ensure completion of the polymerization. The induction coils can also be used to degauss and orient the magnetic particles of the stripe provided the magnetic dispersion is not too viscous.

In a further variation of an induction curing process, a coating wheel composed of an electrically-insulating material is formed with a machined groove to receive the magnetic striping composition from an extruder. The photographic film is brought into contact with the wheel immediately after the striping composition has been deposited in the groove, the stripe is cured in contact with the film by passing the coating wheel through induction coils to generate heat in the stripe, and the film is then separated from the wheel with the stripe adhering to the film. This method is advantageous in providing a magnetic recording stripe with precise dimensions, a desired rectangular profile, and superior surface properties resulting from the polishing action of the coating wheel.

Apparatus suitable for carrying out curing of the stripe by the application of heat, such as a curing chamber utilizing air impingement, electrically heated rolls which transfer heat to the stripe by conduction, and induction heating equipment, is well known and can be especially adapted to the specific requirements of the method of this invention. Apparatus and methods for the radiation curing of polymerizable compositions by subjecting them to suitable forms of radiation are also well known and any suitable radiation-curing process can be used in carrying out this invention. For example, curing can be carried out by the application of ultraviolet radiation of suitable intensity. It can also be carried out by the use of high energy electrons using an intensity sufficient to penetrate to the support and a total dosage sufficient to convert the reactive liquid medium to a solid polymeric material. Typically, dosages in the range of about 0.2 to about 50 megarads, are employed.

Two or more different methods of curing can be utilized in combination if desired. For example, the magnetic stripe can be partially cured by contact with a heated metal roll and curing can then be completed by an induction-heating process.

A particularly effective technique for curing a magnetic stripe formed from the striping composition described herein is by use of the method described in copending commonly assigned U.S. Patent application Ser. No. 037,585, entitled "Method For Forming Magnetic Recording Regions On Photographic Elements" filed on May 9, 1979, in the names of Walter W. Jacobe and Gary K. Bien and issued Apr. 7, 1981 as U.S. Pat. No. 4,260,648, the disclosure of which is incorporated herein by reference. As described in application Ser. No. 037,585, curing can be accomplished by bringing the striped photographic element into contact with the cylindrical surface of a cylindrical roller that is mounted for rotation about its axis, the roller being heated by induction only within a rim portion thereof so as to generate heat adjacent to the cylindrical surface for efficient transfer to the photographic element.

In the method of this invention, the use of a polymerization initiator is optional depending on the method of curing that is used. Thus, for example, in carrying out curing by electron radiation, it is not necessary to use an initiator. However, when the magnetic stripe is cured by the use of ultraviolet radiation, a photoinitiator should be included in the composition. Many photoinitiators which are useful for such purpose are known to the art, for example, butyl benzoin ether, isobutyl benzoin ether, ethyl benzoin ether, benzophenone, benzoin, acetophenone dimethyl quinoxaline, 4,4'-bis(dimethylamino) benzophenone, and the like. Such photoinitiators may be used singly or in combination. In carrying out curing of the magnetic stripe by the application of heat, a heat-activated polymerization initiator is utilized. The initiator should be stable at room temperature to facilitate handling of the striping composition, yet should have a relatively low activation temperature to obtain a rapid rate of cure. Peroxides and azo compounds are especially useful as heat-activated polymerization initiators. A particularly preferred peroxide for this purpose is 2,4-dichlorobenzoyl peroxide. A particularly preferred azo initiator is 2,2'-azobis(isobutyronitrile). Initiators are utilized in small amounts such as amounts of about 1 to about 5 percent, on a weight basis, of the amount of acrylated epoxy resin.

The magnetic stripe that is deposited in accordance with the present invention will vary in width and thickness depending on the requirements of the particular photographic element. For example, for 8 millimeter motion picture film, the magnetic recording stripe typically has a width of about 0.7 millimeters and a thickness of about 0.01 millimeters while for 16 millimeter motion picture film, the magnetic recording stripe typically has a width of about 2.5 millimeters and a thickness of about 0.01 millimeters. Generally, a balance stripe is coated as well as a recording stripe. The balance stripe, which ordinarily is narrower than the recording stripe but of the same thickness, can be coated at the same time as the recording stripe or in a separate coating operation.

The invention is further illustrated by the following examples of its practice.

EXAMPLE 1

A magnetic striping composition was prepared utilizing an acrylated epoxy resin of the formula:

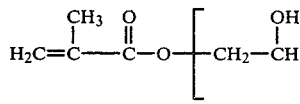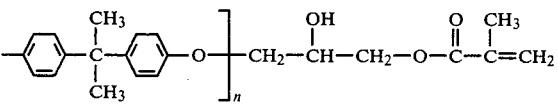

wherein n has a value of about 13.
The composition was as follows:

| Component | Parts by Weight |
| --- | --- |
| Acrylated epoxy resin | 70 |
| Butyl acrylate | 20 |
| Neopentyl glycol diacrylate | 10 |
| Methyl ethyl ketone | 100 |
| Acetone | 10 |
| Methanol | 10 |
| 2,4-Dichlorobenzoyl peroxide[1] | 5 |
| Iron Oxide ($\gamma$-$Fe_2O_3$) | 120 |

[1]50% by weight solution in dibutyl phthalate.

The magnetic striping composition was formed by mixing the above components together and ball milling for five days. It had a viscosity of 1100 centipoises as measured with a Brookfield $B_2$ Spindle HAT Viscometer at 30 rpm. It was coated as a stripe with a width of 2.5 millimeters and a thickness of 0.01 millimeters on the anti-halation layer of 16 millimeter motion picture film. The motion picture film had a support composed of cellulose triacetate, an anti-halation layer on one side of the support containing carbon black and cellulose acetate phthalate, and gelatino/silver halide emulsion layers on the opposite side. The stripe was cured by heating in a hot air oven at 120° C. for 30 minutes. Magnetic properties of the stripe were tested and found to be fully acceptable. Moreover, the stripe was found to adhere strongly to the film. In order to determine whether it would satisfactorily resist alkaline processing solutions, three portions of the striped film were each soaked for one minute under ultrasonic agitation in 0.1, 1, and 2.5 N solutions of sodium hydroxide, respectively. In each instance, the stripe remained strongly anchored to the film.

Alternative procedures for curing the magnetic stripe were investigated and it was found that the stripe described above was satisfactorily cured in 3 minutes by use of a 450-watt IR lamp spaced at a distance of 5 centimeters, in 8 seconds by contact with a metal roll heated to 150° C., in 4 seconds by ultraviolet radiation at 1.02 joules/$cm^2$, in 0.3 seconds by electron radiation at 10 Mrads, and in 0.2 seconds by induction heating at 5 MHz. In each case, magnetic properties were satisfactory and adhesion of the stripe to the film was excellent, both in the dry state and after immersion in alkaline solutions.

EXAMPLE 2

A magnetic striping composition was prepared utilizing an acrylated epoxy resin similar to that of Example 1. The composition was as follows:

| Component | Parts by Weight |
|---|---|
| Acrylated epoxy resin | 70 |
| Butyl acrylate | 20 |
| Neopentyl glycol diacrylate | 10 |
| Cellulose nitrate (1000–1500 sec) | 10 |
| Methyl ethyl ketone | 171 |
| Acetone | 22 |
| Methanol | 22 |
| 2,4-Dichlorobenzoyl peroxide[1] | 10 |
| Iron Oxide ($\gamma$-$Fe_2O_3$) | 151 |

[1]50% by weight solution in dibutyl phthalate.

The magnetic striping composition was formed by mixing the above components together and ball milling for five days. It had a viscosity of 3,500 centipoises as measured with a Brookfield $B_2$ Spindle HAT Viscometer at 30 rpm. It was coated as a stripe with a width of 2.5 millimeters and a thickness of 0.01 millimeters on the anti-halation layer of 16 millimeter motion picture film. The motion picture film had a support composed of cellulose triacetate, an anti-halation layer on one side of the support containing carbon black and cellulose acetate phthalate, and gelatino/silver halide emulsion layers on the opposite side.

The stripe was cured by passing it twice through an induction coil operating at 5 MHz. Machine speed was 45 cm/sec corresponding to an exposure time of about 0.2 seconds. Magnetic properties of the stripe were tested and found to be fully acceptable. Moreover, the stripe was found to adhere strongly to the film. In order to determine whether it would satisfactorily resist alkaline processing solutions, three portions of the striped film were each soaked for one minute under ultrasonic agitation in 0.1, 1, and 2.5 N solutions of sodium hydroxide, respectively. In each instance, the stripe remained strongly anchored to the film.

Alternative procedures described in Example 1 can also be used to cure the magnetic stripe. These include 8 seconds contact with a metal roll heated to 150 C., heating in an air oven for 30 minutes at 120 C., 4 seconds ultraviolet radiation at 1.02 joules/cm$^2$ and 0.3 seconds electron radiation at 10 Mrads. In each case, magnetic properties were satisfactory and adhesion of the stripe to the film was excellent, both in the dry state and after immersion in alkaline solutions.

EXAMPLE 3

A magnetic striping composition was prepared utilizing an acrylated epoxy resin similar to that of Example 1. The composition was as follows:

| Component | Parts by Weight |
|---|---|
| Acrylated epoxy resin | 333 |
| Neopentyl glycol diacrylate | 111 |
| Cellulose nitrate (1000–1500 sec) | 133 |
| Methyl ethyl ketone | 1736 |
| Acetone | 228 |

-continued

| Component | Parts by Weight |
|---|---|
| Methanol | 228 |
| 2,4-Dichlorobenzoyl peroxide[1] | 44 |
| Iron Oxide ($\gamma$-$Fe_2O_3$) | 672 |

[1]50% by weight solution in dibutyl phthalate.

The magnetic striping composition was prepared, coated and induction cured as in Example 2 by passing the stripe-coated film through the induction coil twice at a machine speed of 45 cm/sec.

Magnetic properties, adhesion and resistance to alkaline processing solutions, were excellent.

EXAMPLE 4

A magnetic striping composition was prepared utilizing an acrylated epoxy resin similar to that of Example 1. The composition was as follows:

| Component | Parts by Weight |
|---|---|
| Acrylated epoxy resin | 77 |
| 1,6-Hexanediol diacrylate | 26 |
| Cellulose nitrate (1000–1500 sec) | 31 |
| 2,4-Dichlorobenzoyl peroxide[1] | 5.2 |
| 2,2'-Azobis (isobutyronitrile) | 2.6 |
| Methyl ethyl ketone | 351 |
| Acetone | 46 |
| Methanol | 46 |
| Iron Oxide ($\gamma$-$Fe_2O_3$) | 156 |

[1]50% by weight solution in dibutyl phthalate.

The magnetic striping composition was prepared, coated and induction cured as in Example 2 by passing the stripe coated film through the induction coil twice at a machine speed of 45 cm/sec.

Magnetic properties, adhesion and resistance to alkaline processing solutions, were excellent.

EXAMPLE 5

A magnetic striping composition was prepared utilizing an acrylated epoxy resin similar to that of Example 1. The composition was as follows:

| Component | Parts by Weight |
|---|---|
| Acrylated epoxy resin | 77 |
| 1,6-Hexanediol diacrylate | 26 |
| Cellulose nitrate (1000–1500 sec) | 31 |
| Ethyl acetate | 215 |
| Methanol | 263 |
| 2,4-Dichlorobenzoyl peroxide[1] | 10 |
| Iron Oxide ($\gamma$-$Fe_2O_3$) | 156 |

[1]50% by weight solution in dibutyl phthalate.

The magnetic striping composition was prepared, coated and induction cured as in Example 2 by passing the stripe coated film through the induction coil twice at a machine speed of 45 cm/sec.

Magnetic properties, adhesion and resistance to alkaline processing solutions, were excellent.

As shown by the above examples, the combination of an acrylated epoxy resin, a polymerizable acrylic monomer, and an organic solvent exhibits highly desirable properties which makes it especially well adapted for use in magnetic striping of photographic elements. Thus, for example, this combination provides a liquid medium which is capable of accepting a high loading of magnetic particles and maintaining them in a uniformly dispersed state, which has adequate storage stability to facilitate handling, which is easy to coat, which is capable of effectively penetrating the anti-halation layer of a photographic element, which can be rapidly cured, and which forms an alkali-insoluble cross-linked matrix that is strongly anchored to the photographic support.

The invention has been described in detail with particular reference to preferred embodiments thereof, but it will be understood that variations and modifications can be effected within the spirit and scope of the invention.

We claim:

1. A method of forming a magnetic stripe on a photographic element, said element comprising a support having thereon an anti-halation layer which contains an alkali-soluble binder that renders such layer removable by an alkaline photographic processing solution, said magnetic stripe being composite with said anti-halation layer and bonded to said support so as to resist removal by an alkaline photographic processing solution, which method comprises the steps of:
   (1) depositing on the anti-halation layer of said element a stripe of a composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of (a) an acrylated epoxy resin, (b) a polymerizable acrylic monomer, and (c) an organic solvent that is capable of solubilizing said anti-halation layer, and
   (2) curing said stripe to convert said liquid medium to an alkali-insoluble cross-linked polymeric matrix which surrounds said magnetic particles and bonds to said support, thereby forming a magnetic stripe which is composite with said anti-halation layer and resistant to removal by alkaline photographic processing solutions.

2. A method of forming a magnetic stripe on a photographic element, said element comprising a support having thereon an anti-halation layer which contains an alkali-soluble binder that renders such layer removable by an alkaline photographic processing solution, said magnetic stripe being composite with said anti-halation layer and bonded to said support so as to resist removal by an alkaline photographic processing solution, which method comprises the steps of:
   (1) depositing on the anti-halation layer of said element a stripe of a composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of (a) an acrylated epoxy resin, (b) a polymerizable acrylic monomer, (c) a lower aliphatic alcohol and (d) a member selected from the group consisting of ketones and organic esters, and
   (2) curing said stripe to convert said liquid medium to an alkali-insoluble cross-linked polymeric matrix which surrounds said magnetic particles and bonds to said support, thereby forming a magnetic stripe which is composite with said anti-halation layer and resistant to removal by alkaline photographic processing solutions.

3. A method as claimed in claim 1 wherein said acrylated epoxy resin has the formula:

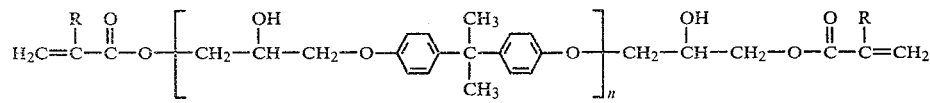

wherein R is a hydrogen atom or a methyl group and n is 1 to 20.

4. A method as claimed in claim 1 wherein said polymerizable acrylic monomer is a difunctional monomer.

5. A method as claimed in claim 1 wherein said polymerizable acrylic monomer has the formula:

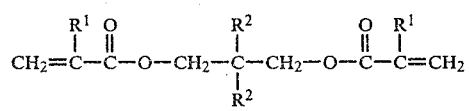

wherein each $R^1$ is independently selected from the group consisting of a hydrogen atom and an alkyl group of 1 to 2 carbon atoms, and each $R^2$ is independently selected from the group consisting of an alkyl group of 1 to 6 carbon atoms and a radical of the formula:

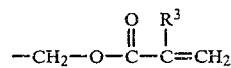

in which $R^3$ is a hydrogen atom or an alkyl group of 1 to 2 carbon atoms.

6. A method as claimed in claim 1 wherein said polymerizable acrylic monomer is neopentylglycol diacrylate.

7. A method as claimed in claim 1 wherein said polymerizable acrylic monomer comprises butyl acrylate and neopentylglycol diacrylate.

8. A method as claimed in claim 1 wherein said organic solvent comprises methanol and acetone.

9. A method as claimed in claim 1 wherein said organic solvent comprises methanol and ethyl acetate.

10. A method as claimed in claim 1 wherein said support is cellulose triacetate.

11. A method as claimed in claim 1 wherein said alkali-soluble binder is cellulose acetate phthalate.

12. A method of forming a magnetic stripe on a photographic element comprising a support having thereon an anti-halation layer which contains an alkali-soluble binder that renders such layer removable by an alkaline photographic processing solution, said magnetic stripe being composite with said anti-halation layer and bonded to said support so as to resist removal by an alkaline photographic processing solution, which method comprises the steps of:
   (1) depositing on the anti-halation layer of said element a stripe of a composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of
(a) an acrylated epoxy resin of the formula:

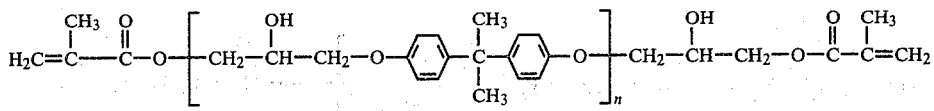

wherein n has a value of about 13,
(b) butyl acrylate
(c) neopentylglycol diacrylate
(d) methyl ethyl ketone
(e) acetone
(f) methanol, and
(g) 2,4-dichlorobenzoyl peroxide and
(2) curing said stripe to convert said liquid medium to an alkali-insoluble cross-linked polymeric matrix which surrounds said magnetic particles and bonds to said support, thereby forming a magnetic stripe which is composite with said anti-halation layer and resistant to removal by alkaline photographic processing solutions.

13. A method of forming a magnetic stripe on a photographic element comprising a support having thereon an anti-halation layer which contains an alkali-soluble binder that renders such layer removable by an alkaline photographic processing solution, said magnetic stripe being composite with said anti-halation layer and bonded to said support so as to resist removal by an alkaline photographic processing solution, which method comprises the steps of:

(1) depositing on the anti-halation layer of said element a stripe of a composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of
(a) an acrylated epoxy resin of the formula:

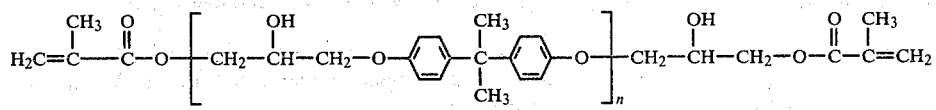

wherein n has a value of about 13,
(b) 1,6-hexanediol diacrylate
(c) cellulose nitrate
(d) ethyl acetate
(e) methanol, and
(f) 2,4-dichlorobenzoyl peroxide and
(2) curing said stripe to convert said liquid medium to an alkali-insoluble cross-linked polymeric matrix which surrounds said magnetic particles and bonds to said support, thereby forming a magnetic stripe which is composite with said anti-halation layer and resistant to removal by alkaline photographic processing solutions.

14. A photographic element comprising a support, an anti-halation layer on said support which contains an alkali-soluble binder that renders such layer removable by an alkaline photographic processing solution, and a magnetic stripe which is composite with said anti-halation layer and bonded to said support so as to resist removal by an alkaline photographic processing solution, said magnetic stripe having been formed by:

(1) depositing on the anti-halation layer of said element a stripe of a composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of (a) an acrylated epoxy resin, (b) a polymerizable acrylic monomer, and (c) an organic solvent that is capable of solubilizing said anti-halation layer, and
(2) curing said stripe to convert said liquid medium to an alkali-insoluble cross-linked polymeric matrix which surrounds said magnetic particles and bonds to said support, thereby forming a magnetic stripe which is composite with said anti-halation layer and resistant to removal by alkaline photographic processing solutions.

15. A photographic element as claimed in claim 14 wherein said acrylated epoxy resin has the formula:

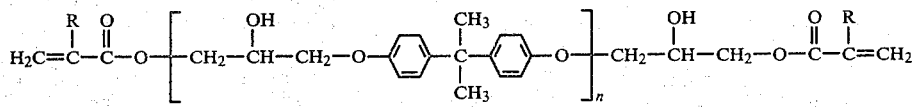

wherein R is a hydrogen atom or a methyl group and n is 1 to 20.

16. A photographic element as claimed in claim 14 wherein said polymerizable acrylic monomer is a difunctional monomer.

17. A photographic element as claimed in claim 14 wherein said polymerizable acrylic monomer has the formula:

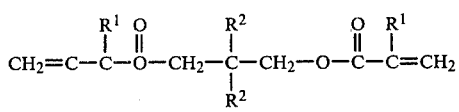

wherein each $R^1$ is independently selected from the group consisting of a hydrogen atom and an alkyl group of 1 to 2 carbon atoms, and each $R^2$ is independently selected from the group consisting of an alkyl group of 1 to 6 carbon atoms and a radical of the formula:

$$-CH_2-O-\overset{O}{\overset{\|}{C}}-\overset{R^3}{\overset{|}{C}}=CH_2$$

in which $R^3$ is a hydrogen atom or an alkyl group of 1 to 2 carbon atoms.

18. A photographic element as claimed in claim 14 wherein said polymerizable acrylic monomer is neopentylglycol diacrylate.

19. A photographic element as claimed in claim 14 wherein said polymerizable acrylic monomer comprises butyl acrylate and neopentylglycol diacrylate.

20. A photographic element as claimed in claim 14 wherein said polymerizable acrylic monomer is 1,6-hexanediol diacrylate.

21. A photographic element as claimed in claim 14 wherein said organic solvent comprises a lower aliphatic alcohol and a member selected from the group consisting of ketones and organic esters.

22. A photographic element as claimed in claim 14 wherein said organic solvent comprises methanol and acetone.

23. A photographic element as claimed in claim 14 wherein said organic solvent comprises methanol and ethyl acetate.

24. A photographic element as claimed in claim 14 wherein said support is cellulose triacetate.

25. A photographic element as claimed in claim 14 wherein said alkali-soluble binder is cellulose acetate phthalate.

26. A coating composition which is useful for forming a magnetic stripe on a photographic element comprising a support and an anti-halation layer, said anti-halation layer containing an alkali-soluble binder that renders said layer removable by an alkaline photographic processing solution and said magnetic stripe being composite with said anti-halation layer and bonded to said support so as to resist removal by an alkaline photographic processing solution, said coating composition comprising a suspension of finely-divided magnetic particles in a liquid medium which is capable of penetrating through said anti-halation layer and being cured to an alkali-insoluble cross-linked polymeric matrix which surrounds said magnetic particles and bonds to said support, said liquid medium consisting essentially of (a) an acrylated epoxy resin, (b) a polymerizable acrylic monomer, and (c) an organic solvent that is capable of solubilizing said anti-halation layer.

27. A coating composition as claimed in claim 26 wherein said acrylated epoxy resin has the formula:

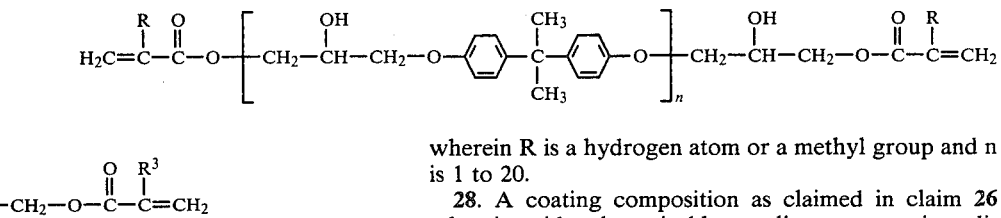

wherein R is a hydrogen atom or a methyl group and n is 1 to 20.

28. A coating composition as claimed in claim 26 wherein said polymerizable acrylic monomer is a difunctional monomer.

29. A coating composition as claimed in claim 26 wherein said polymerizable acrylic monomer has the formula:

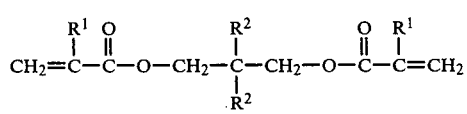

wherein each $R^1$ is independently selected from the group consisting of a hydrogen atom and an alkyl group of 1 to 2 carbon atoms, and each $R^2$ is independently selected from the group consisting of an alkyl group of 1 to 6 carbon atoms and a radical of the formula:

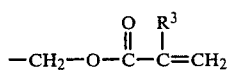

in which $R^3$ is a hydrogen atom or an alkyl group of 1 to 2 carbon atoms.

30. A coating composition as claimed in claim 26 wherein said polymerizable acrylic monomer is neopentylglycol diacrylate.

31. A coating composition as claimed in claim 26 wherein said polymerizable acrylic monomer comprises butyl acrylate and neopentylglycol diacrylate.

32. A coating composition as claimed in claim 26 wherein said polymerizable acrylic monomer is 1,6-hexanediol diacrylate.

33. A coating composition as claimed in claim 26 wherein said organic solvent comprises a lower aliphatic alcohol and a member selected from the group consisting of ketones and organic esters.

34. A coating composition as claimed in claim 26 wherein said organic solvent comprises methanol and acetone.

35. A coating composition as claimed in claim 26 wherein said organic solvent comprises methanol and ethyl acetate.

* * * * *